United States Patent
Stern et al.

(10) Patent No.: US 10,666,380 B2
(45) Date of Patent: May 26, 2020

(54) PROCESSING OF MULTIMODE OPTICAL SIGNALS

(71) Applicant: Cornell University, Ithaca, NY (US)

(72) Inventors: Brian Stern, Ithaca, NY (US); Michal Lipson, New York, NY (US)

(73) Assignee: Cornell University, Ithaca, NY (US)

( * ) Notice: Subject to any disclaimer, the term of this patent is extended or adjusted under 35 U.S.C. 154(b) by 27 days.

(21) Appl. No.: 15/537,870

(22) PCT Filed: Dec. 21, 2015

(86) PCT No.: PCT/US2015/067229
§ 371 (c)(1),
(2) Date: Jun. 19, 2017

(87) PCT Pub. No.: WO2016/100989
PCT Pub. Date: Jun. 23, 2016

(65) Prior Publication Data
US 2019/0044640 A1      Feb. 7, 2019

Related U.S. Application Data

(60) Provisional application No. 62/094,904, filed on Dec. 19, 2014.

(51) Int. Cl.
*H04J 14/04*          (2006.01)
*H04Q 11/00*         (2006.01)
(Continued)

(52) U.S. Cl.
CPC ............ *H04J 14/04* (2013.01); *G02B 6/2938* (2013.01); *G02B 6/29343* (2013.01);
(Continued)

(58) Field of Classification Search
CPC ... H04J 14/04; G02B 6/2938; G02B 6/29343; G02B 6/29395; H04Q 11/0005;
(Continued)

(56) References Cited

U.S. PATENT DOCUMENTS

2005/0226552 A1   10/2005   Narevicius et al.
2007/0165980 A1   7/2007   Jenkins et al.
(Continued)

FOREIGN PATENT DOCUMENTS

WO        2013188592 A1   12/2013

OTHER PUBLICATIONS

International Search Report and Written Opinion dated Jul. 5, 2016 for PCT Application No. PCT/US2015/067229, 17 pages.
(Continued)

*Primary Examiner* — Leslie C Pascal
(74) *Attorney, Agent, or Firm* — Perkins Coie LLP

(57) ABSTRACT

This patent document provides optical processing and switching of optical channels based on mode-division multiplexing (MDM) and wavelength division multiplexing (WDM). In one implementation, a method is provided for processing different optical signal channels to include receiving different input optical signal channels in different optical waveguide modes and in different wavelengths; converting input optical signal channels in multimodes into single-mode optical signal channels, respectively; subsequent to the conversion, processing single-mode optical signal channels obtained from the different input optical signal channels to re-group single-mode optical signal channels into different groups of processed single-mode optical signal channels; and converting different groups of the processed single-mode optical signal channels into different groups of output optical signal channels containing one or more optical signal channels in multimodes multimode signals to direct the groups as different optical outputs.

26 Claims, 10 Drawing Sheets

(51) Int. Cl.
*H04B 10/2581* (2013.01)
*G02F 1/01* (2006.01)
*G02F 1/065* (2006.01)
*G02B 6/293* (2006.01)

(52) U.S. Cl.
CPC .......... *G02B 6/29395* (2013.01); *G02F 1/011* (2013.01); *G02F 1/0136* (2013.01); *G02F 1/0147* (2013.01); *G02F 1/065* (2013.01); *H04B 10/2581* (2013.01); *H04Q 11/0005* (2013.01); *G02F 2001/0144* (2013.01); *G02F 2201/05* (2013.01); *G02F 2203/15* (2013.01); *G02F 2203/58* (2013.01); *G02F 2203/585* (2013.01); *H04Q 2011/0007* (2013.01); *H04Q 2011/0035* (2013.01); *H04Q 2011/0052* (2013.01)

(58) Field of Classification Search
CPC ... H04Q 2011/0007; H04Q 2011/0052; H04Q 2011/0035; H04B 10/2581; G02F 1/011; G02F 1/0147; G02F 1/065; G02F 1/0136; G02F 2203/585; G02F 2001/0144; G02F 2203/58; G02F 2203/15; G02F 2201/05
USPC .......................................................... 398/44
See application file for complete search history.

(56) References Cited

U.S. PATENT DOCUMENTS

| | | | |
|---|---|---|---|
| 2010/0092172 A1 | 4/2010 | Chung et al. | |
| 2011/0013266 A1 | 1/2011 | Preble et al. | |
| 2011/0170821 A1 | 7/2011 | Lipson et al. | |
| 2013/0064501 A1 | 3/2013 | Lipson et al. | |
| 2014/0140694 A1* | 5/2014 | Zhou ....................... | H04J 14/02 398/44 |
| 2014/0219657 A1 | 8/2014 | Simmonneau et al. | |
| 2015/0085884 A1* | 3/2015 | Fontaine ................. | H04J 14/06 370/542 |
| 2017/0078771 A1* | 3/2017 | Lingampalli ...... | H04Q 11/0067 |
| 2017/0299812 A1* | 10/2017 | Zhao ....................... | H04J 14/04 |

OTHER PUBLICATIONS

Almeida et al., "Nanotaper for compact mode conversion", Opt. Lett., 28, 2003, pp. 1302-1304.
Almeida et al., "All-optical control of light on a silicon chip", Nature 431, 2004, pp. 1081-1084.
Cardenas et al., "High Coupling Efficiency Etched Facet Tapers in Silicon Waveguides", IEEE Photonics Technol. Lett 26, 2014, pp. 2380-2382.
Carpenter et al., "1x11 Few-Mode Fiber Wavelength Selective Switch using Photonic Lanterns", in Optical Fiber Communication Conference Th4A.2 (Optical Society of America, 2014). doi:10.1364/OFC.2014_Th4A2.
Chan et al., "Data Transmission Using Wavelength-Selective Spatial Routing for Photonic Interconnection Networks", in Optical Fiber Communication Conference/National Fiber Optic Engineers Conference 2011 OThQ3 (Optical Society of America, 2011). doi:10.1364/OFC.2011.OThQ3.
Chen et al., "Mode multi/demultiplexer based on cascaded asymmetric Y-junctions", Opt. Express 21, 2013, pp. 25113-25119.
Chen et al., "Experimental Demonstration of Spatial Scaling for High-Throughput Transmission Through A Si Mode-Division-Multiplexing Waveguide. in Advanced Photonics for Communications IM2A.3", Optical Society of America, 2014, doi:10.1364/IPRSN.2014.1M2A.3.
Cvijetic et al., "Dynamic multidimensional optical networking based on spatial and spectral processing", Opt. Express 20, 2012, pp. 9144-9150.

Dorin et al., "Two-mode division multiplexing in a silicon-on-insulator ring resonator", Opt. Express 22, 2014, pp. 4547-4558.
Dai et al., "Silicon multimode photonic integrated devices for on-chip mode-division-multiplexed optical interconnects." Progress in Electromagnetics Research 143 (2013): 773-819.
Driscoll, et al., "A 60 Gb/s MDM-WDM Si photonic link with < 0.7 dB power penalty per channel", Opt. Express 22, 2014, pp. 18543-18555.
Driscoll, et al., "Asymmetric Y junctions in silicon waveguides for on-chip mode-division multiplexing", Opt. Lett. 38, 2013, pp. 1854-1856.
Fontaine, N.K. et al., "Space-division multiplexing and all-optical MIMO demultiplexing using a photonic integrated circuit", Optical Fiber Communication Conference PDP5B.1, Optical Society of America, 2012, doi:10.1364/OFC/2012.PDP5B.1.
Frandsen et al., Topology optimized mode conversion in a photonic crystal waveguide fabricated in silicon-on-insulator material, Opt. Express 22, 2014, pp. 8525-8532.
Greenberg et al., "Multimode add-drop multiplexing by adiabatic linearly tapered coupling", Opt. Express 13, 2005, pp. 9381-9387.
Igarashi, K. et al., "Super-Nyquist-WDM transmission over 7.326-km seven=core fiber witgh capacity distance product of 1.03 Exabit/s km", Pot. Express 22, 2014, pp. 1220-1228.
Ip, E. et al., "Few-mode fiber transmission with in-line few-mode erbium-doped fiber amplifier", Proc. of SPI col. 8647, 2013, pp. 864709-864709-10.
Lee et al., "Mode-order converter in a multimode waveguide", Opt. Lett. 28, 2003, pp. 1660-1662.
Luo, L-W. et al., "WDM-compatible mode-division multiplexing on a silicon chip", Nat. Commun. 5, 2014.
Randel, S. et al. "6x56-Gb/s mode-division mutiplexed transmission over 33-km few-mode fiber enabled by 6x6 MIMO equalization", Opt. Express, 19, 2011, p. 16697.
Ruege et al., "Multimode Waveguides Coupled to Single Mode Ring Resonators", J. Light. Technol. 27, 2009, pp. 2035-2043.
Ryf, R. et al., "1705-km Transmission over Coupled-Core Fibre Supporting 6 Spatial Modes", 2014, at <http://sierra.ece.ucdavis.edu/Papers/2014/ECOC2014_0942.pdf>.
Ryf, R. et al., "Mode-division Multiplexing Over 96 km of Few-Mode Fiber Using Coherent 6 6 MIMO Processing", J. Light. Technol. 30, 2012, pp. 521-531.
Ryf et al., "Wavelength-selective switch for few-mode fiber transmission", in 39th European Conference and Exhibition on Optical Communication (ECOC 2013) 1-3 (2013). doi:10.1049/cp.2013.1681.
Saitoh et al., "PLC-based LP11 mode rotator for mode-division multiplexing transmission", Opt. Express 22, 2014, pp. 19117-19130.
Sakaguchi, J. et al., "305 tb/s Space Division Multiplexed Transmission Using Homogeneous 19-Core Fiber", J. Light. Technol. 31, 2013, pp. 554-562.
"Sherwood-Droz, ""Optical 4x4 hitless slicon router for optical networks-on-chip (NoC)""", Opt. Express 16, 2008, pp. 15915-15922."
Stern, B. et al., "On-chip mode-division multiplexing switch", Optica, vol. 2, No. 6, Jun. 2015, pp. 530-535.
Takara, H. et al. "1.01-Pb/s (12 SDM/222 WDM/456 Gb/s) Crosstalk-managed Transmission with 91.4-b/s/Hz Aggregate Spectral Efficiency", in European Conference and Exhibition on Optical Communication Th.3.C.1 (Optical Society of America, 2012). doi:10.1364/ECEOC_2012.Th.3.C.1.
Van Uden et al., "Ultra-high-density spatial division multiplexing with a few-mode multicore fibre", Nat. Photonics 8, 2014, pp. 865-870.
Wang et al., "Improved 8-channel silicon mode demultiplexer with grating polarizers", Opt. Express 22, 2014, p. 12799-12807.
"Xu et al., ""Silicon microring resonators with 1.5-μm radius""", Opt. Express 16, 2008, pp. 4309-4315."
Yang et al., "Silicon nitride three-mode division multiplexing and wavelength-division multiplexing using asymmetrical directional couplers and microring resonators", Opt. Express 22, 2014, pp. 22172-22183.

(56) References Cited

OTHER PUBLICATIONS

Yariv, A., "Universal relations for coupling of optical power between microresonators and dielectric waveguides", Electron. Lett. 36, 2000, pp. 321-322.

* cited by examiner

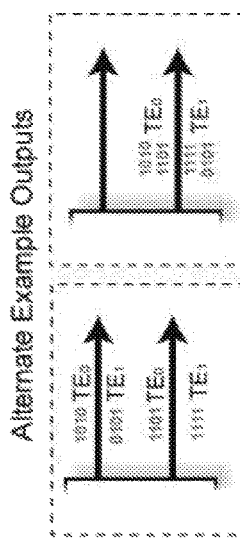
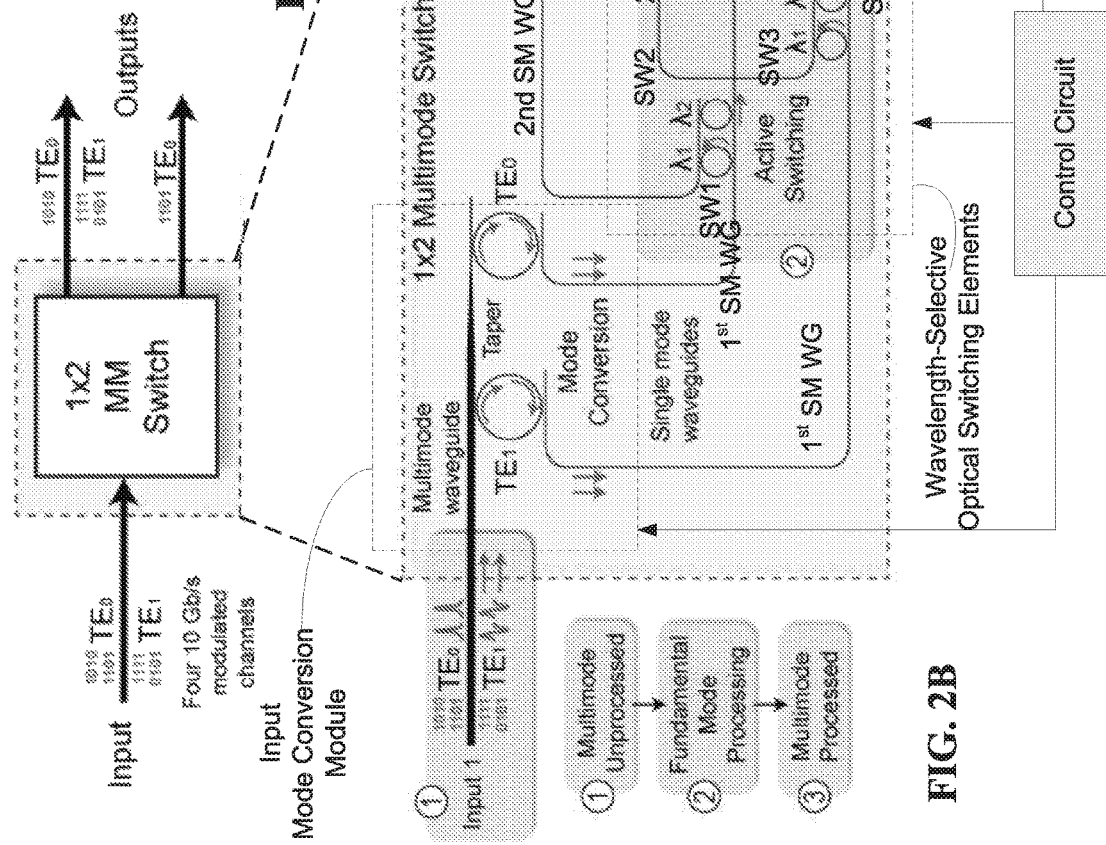
FIG. 2A  FIG. 2B  FIG. 2C  FIG. 2D

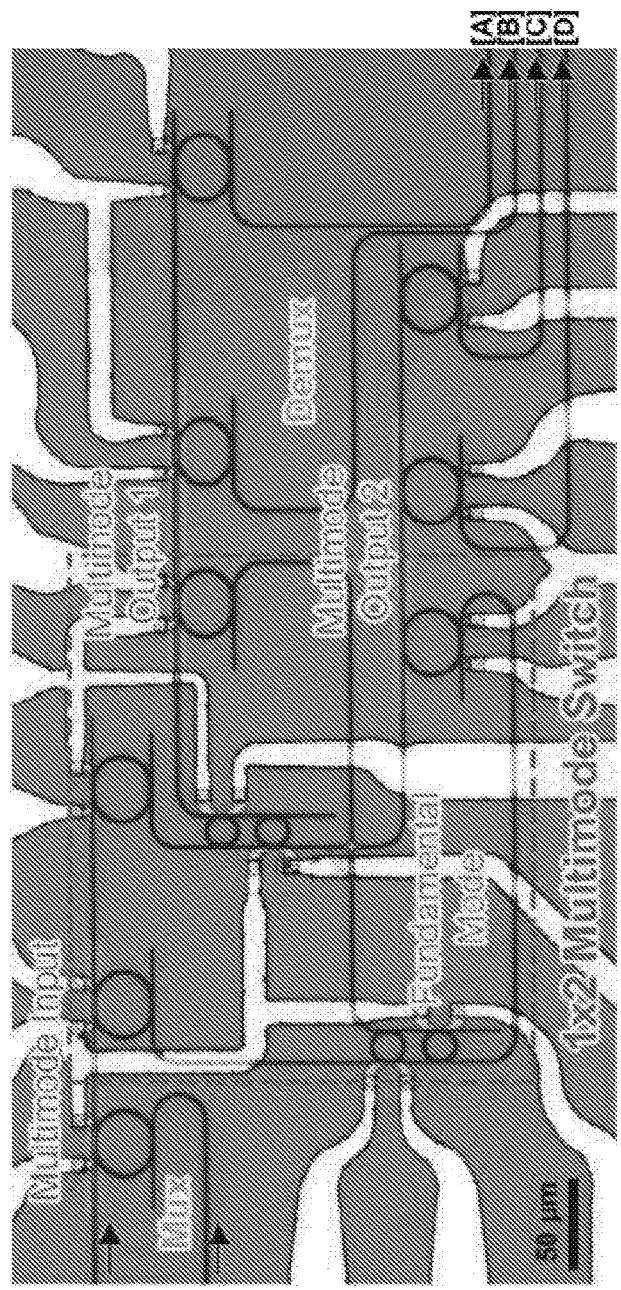
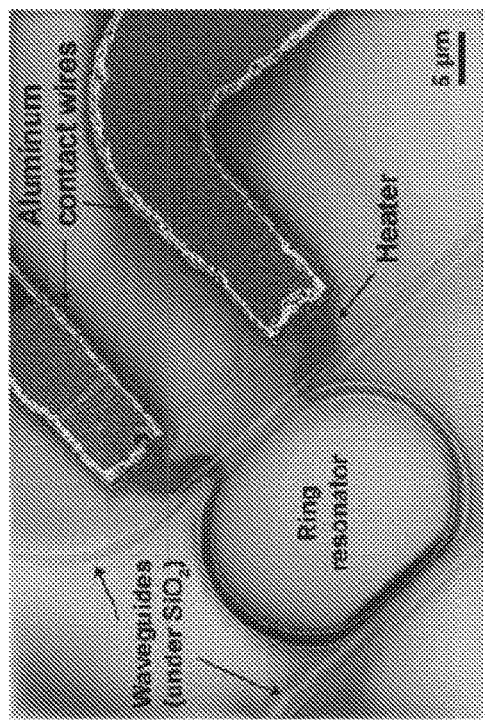
FIG. 3A
FIG. 3B

PROCESSING OF MULTIMODE OPTICAL SIGNALS

PRIORITY CLAIM AND RELATED PATENT APPLICATION

This application is a 35 USC § 371 National Stage application of international application Serial No. PCT/US2015/067229, filed Dec. 21, 2015, which claims priority of U.S. Provisional Application No. 62/094,904 entitled "PROCESSING OF MULTIMODE OPTICAL SIGNALS", filed on Dec. 19, 2014 and is timely filed on Dec. 21, 2015 since Dec. 19, 2015 is a Saturday, the entire content of which is incorporated by reference in its entirety.

TECHNICAL FIELD

This patent document relates to systems, devices, and techniques for processing multimode optical signals.

BACKGROUND

Mode-division multiplexing (MDM) is a technique which has become popular recently as a solution to the slowed growth of bandwidth density for optical communication. As an analogy: in fiber optic cables, wavelength division multiplexing (WDM) technique allows many wavelengths of light to carry signals simultaneously on one fiber optic cable. Recently, to allow even greater bandwidths in one fiber optic cable, significant effort has been put forth to exploit spatial modes by using multimode fibers.

In on-chip photonic integration technology, silicon waveguides have greatly matured in the past decade. Silicon waveguides offer major benefits for optical interconnects, e.g., in datacenters. One of such benefits is to eliminate the need for power inefficient optical-electrical-optical conversion. Both optical fiber and WDM have been implemented on-chip. On-chip MDM is a relatively new effort, but promises enormous increases in on-chip bandwidth by utilizing the spatial modes of integrated waveguides to carry separate optical channels. Recently, multiplexers and demultiplexers for MDM have been demonstrated. Multiplexers take signals on multiple single-mode waveguides and multiplex these signals into a single, multimode waveguide. Demultiplexers perform the reverse process of the Multiplexers.

SUMMARY

MDM has been demonstrated in passive waveguides integrated with wavelength-division multiplexing (WDM). However, MDM-WDM networks with actively routed signals have not been developed. Because the individual spatial modes of waveguides have dissimilar spectral properties and confinements, there are significant barriers for creating the reconfigurable MDM-WDM networks which would address bandwidth bottlenecks in interconnects for datacenters and multi-processors.

Disclosed are systems and techniques of processing a plurality of multimode optical signals by converting the plurality of multimode optical signals to the fundamental modes for subsequent processing. The disclosed techniques allow multiple channels to be equally accessible, regardless of mode or wavelength. Consequently, many processing options become available after the conversion, such as modulation or wavelength-selective switching with small radius, large-FSR rings. After processing the signals, each fundamental mode can be restored to the multimode domain. The conversion between the multimode and single-mode domains can include using phase-matching between a multimode waveguide and sets of identical single-mode ring resonators. In particular, the conversion to fundamental modes allows the use of single mode rings for switching, which avoids limitations in multimode WDM. With WDM-compatibility and individual channel control, a 1×2 reconfigurable on-chip switch that routes four channels between multimode waveguides has been demonstrated.

This patent disclosure also discloses an integrated multimode optical switch, which processes multimode signals in the fundamental mode domain. We show exemplary switches with low (<−20 dB) crosstalk between modes and error-free (BER<$10^{-9}$) switching of four optical data channels to two outputs with power penalties of 0.52-1.42 dB. These results demonstrate the potential of building ultra-high-bandwidth, reconfigurable on-chip MDM-WDM networks.

In one aspect, a method is provided for processing a set of multimode optical signals to include receiving a set of multimode optical signals as input; converting the set of multimode optical signals into a corresponding set of single-mode signals, wherein each multimode optical signal is converted into a corresponding single-mode signal; processing the set of single-mode signals; and converting the set of processed single-mode signals back to a set of processed multimode signals, wherein each processed single-mode signal is converted back to a corresponding processed multimode signal. In implementations, the set of single-mode signals may include a set of fundamental mode signals; converting the set of multimode optical signals into the corresponding set of single-mode signals may be implemented to preserve identification information of each of the set of multimode signals; the set of multimode optical signals may be configured such that different modes in the set of multimode optical signals are separated; after converting the set of multimode optical signals into the corresponding set of single-mode signals, each of the set of single-mode signals may be equally accessible, regardless of the associated mode or wavelength of the single-mode signal; and processing the set of single-mode signals may include individually processing each of the set of single-mode signals and the processing of each of the set of single-mode signals may include modulation, switching, or filtering. In other implementations, converting the set of multimode optical signals into the corresponding set of single-mode signals may include guiding each of the set of multimode optical signals into a different single-mode waveguide and receiving the set of multimode optical signals as input may include receiving the set of multimode optical signals in a multimode input waveguide, and converting the set of multimode optical signals into the corresponding set of single-mode signals may include using a phase-matching condition between the multimode input waveguide and the set of single-mode waveguides and the phase-matching condition may be met when the index of refraction for a multimode optical signal in the multimode input waveguide matches the index of refraction of the corresponding single-mode signal in the corresponding single-mode waveguide. In yet other implementations, if the set of multimode optical signals include wavelength-division multiplexing (WDM), converting the set of multimode optical signals includes retaining the set of wavelengths associated with the WDM; the received set of multimode optical signals are generated at least partially based on mode-division multiplexing (MDM); and the set of multimode optical signals are spatial modes obtained through a multimode waveguide or a multimode fiber.

In another aspect, a system is provided for processing a set of multimode optical signals to include a multimode input waveguide configured to receive a set of multimode optical signals as input; a set of single-mode waveguides, each of which is configured to receive a different one of the set multimode optical signals and convert the multimode optical signal into a corresponding single-mode signal; an on-chip optical module configured to process the set of single-mode signals; and one or more multimode output waveguides configured to receive the set of processed single-mode signals and convert the set of processed single-mode signals back to a set of processed multimode signals. In implementations, the set of single-mode signals may include a set of fundamental mode signals; the set of single-mode waveguides may include a set of single-mode microrings configured to convert each multimode optical signal into a corresponding fundamental mode signal through phase-matching. In other implementations, the on-chip optical module is an optical switch such as an active multimode optical switch which may include, e.g., a set of actively-tuned microrings configured to route each single-mode signal individually and each of the set of actively-tuned microrings may be tuned by, e.g., a heater. In other implemetations, the on-chip optical module may be an optical modulator or an optical filter.

In another aspect, an on-chip optical multimode switch is provided to include a substrate; a multimode input waveguide fabricated on the silicon substrate and configured to receive a set of multimode optical signals as input; a set of input microrings coupled to the multimode input waveguide to receive the set of multimode optical signals and to convert each multimode optical signal into a corresponding fundamental mode signal through phase-matching; a set of actively-turned microrings coupled to the set of input microrings to receive the set of fundamental mode signals and to route each fundamental mode signal individually to one of one or more outputs; and two or more multimode output waveguides configured to receive the set of routed fundamental mode signals and to convert the set of fundamental mode signals back to a set of routed multimode signals. In implementations, the substrate may be a silicon substrate or a silicon-on-insulator (SOI) substrate.

In another aspect, an optical switch system is provided to include a substrate; a multimode input waveguide fabricated on the silicon substrate and configured to receive a set of multimode optical signals as input; a set of input microrings coupled to the multimode input waveguide to receive the set of multimode optical signals and to convert each multimode optical signal into a corresponding fundamental mode signal through phase-matching; a set of actively-turned microrings coupled to receive output light from the set of input microrings to selectively couple fundamental mode signals to route different fundamental mode signals to different outputs of the optical switch system; and multimode output waveguides configured to receive the routed fundamental mode signals into different groups of multimode signals at different outputs of the optical switch system.

In yet another aspect, an optical switch system is provided to include an input multimode optical waveguide that carries different input optical signal channels in either different optical wavelengths or different optical waveguide modes; an input optical mode conversion module that receives the different input optical signal channels and outputs the different input signal channels as different single-mode intermediate optical signal channels, respectively; first single-mode optical waveguides coupled to the optical mode conversion module to receive the different single-mode intermediate optical signal channels, each first single-mode optical waveguide being structured to carry a designated single optical mode different an optical mode designated to another first single-mode optical waveguide; second single-mode optical waveguides coupled to receive the different single-mode intermediate optical signal channels that are initially carried by the first single-mode optical waveguides; wavelength-selective optical switching elements, each optically coupled between one of the first single-mode optical waveguides and one of the second single-mode optical waveguides and operable to switch on to couple light of a particular selective wavelength from the first single-mode optical waveguide into a corresponding second single-mode optical waveguide or to switch off to prevent optical coupling between the first and second single-mode optical waveguides; an output optical mode conversion module coupled to the first and second single-mode optical waveguides downstream from the wavelength-selective optical switching elements to receive the different input optical signal channels based on switching performed by the wavelength-selective optical switching elements and to combine at least outputs of at least one first single-mode optical waveguide and one second single-mode optical waveguide to produce different combined optical outputs where each optical output is in a multimode; and output multimode optical waveguides coupled to the output optical mode conversion module to receive the different combined optical outputs that carry different output optical signal channels that correspond to the different input optical signal channels in different combinations of the different input optical signal channels based on switching performed by the wavelength-selective optical switching elements.

In yet another aspect, a method is provided for processing different optical signal channels to include receiving different input optical signal channels in different optical waveguide modes and in different wavelengths; converting input optical signal channels in multimodes into single-mode optical signal channels, respectively; subsequent to the conversion, processing single-mode optical signal channels obtained from the different input optical signal channels to re-group single-mode optical signal channels into different groups of processed single-mode optical signal channels; and converting different groups of the processed single-mode optical signal channels into different groups of output optical signal channels containing one or more optical signal channels in multimodes multimode signals to direct the groups as different optical outputs.

The above aspects, features and their implementations are described in greater detail in the drawings, the description and the claims.

BRIEF DESCRIPTION OF THE DRAWINGS

FIG. 2A shows a block diagram of 1×2 multimode switch operation.

FIG. 2B shows a schematic of an exemplary multimode switch implementation.

FIG. 2C shows an example where SW1 is on, SW2 is off, SW3 is off and SW4 is on.

FIG. 2D shows an example where SW1 is off, SW2 is off, SW3 is off and SW4 is off.

FIG. 3A shows an optical microscope image of a fabricated device.

FIG. 3B shows a scanning electron microscope (SEM) image of the clad device with active heaters used to tune the rings.

DETAILED DESCRIPTION

Figure 1:
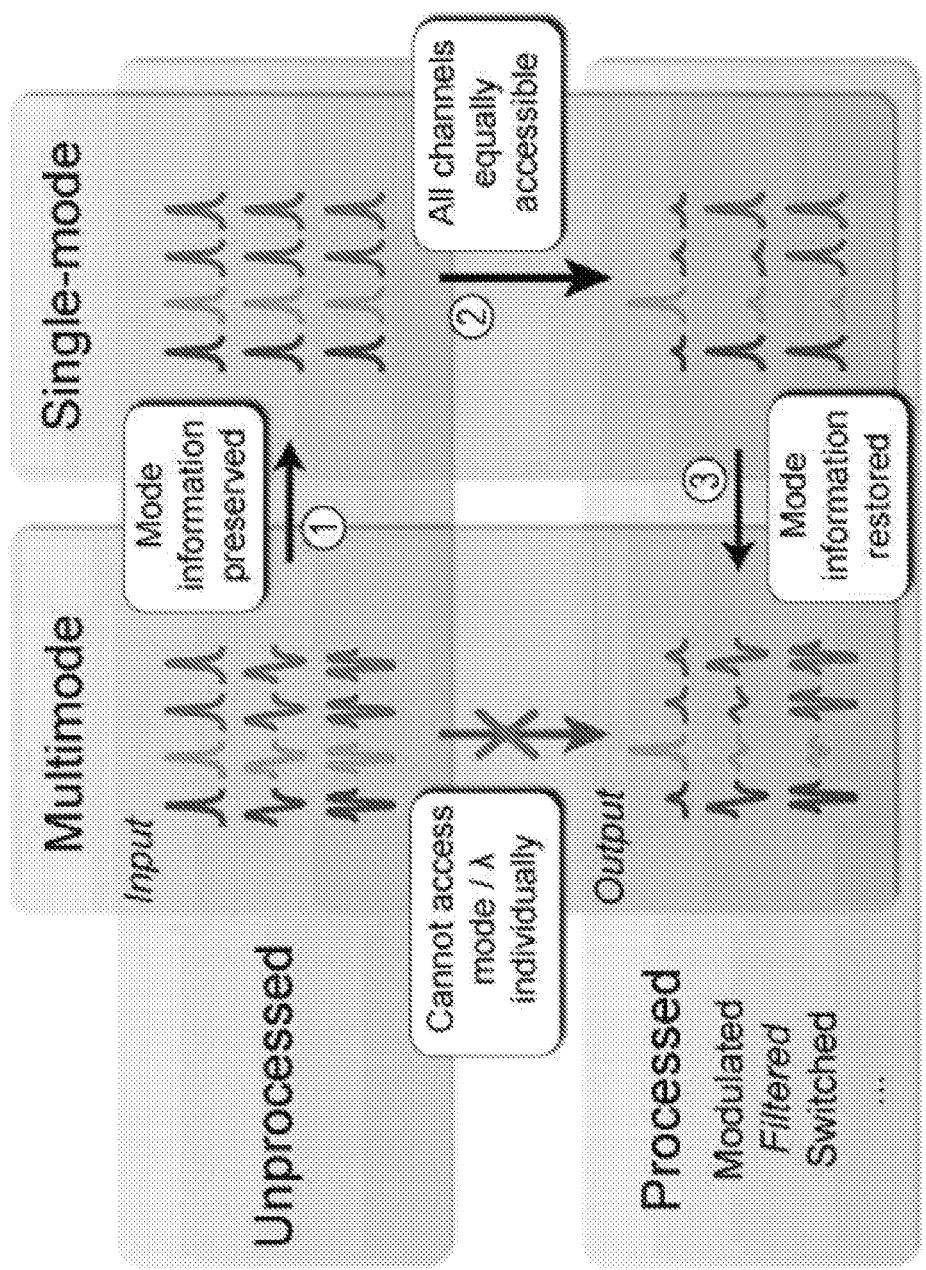
FIG. 1 shows a diagram illustrating an exemplary process of the multimode processing technique.

The disclosed technology provides systems and methods for multimode and multi-wavelength signal processing and switching.

Mode-division multiplexing (MDM) on integrated waveguides has emerged recently as a solution to increase bandwidth density of optical interconnects for datacenters and multi-processors. By leveraging the orthogonal spatial modes of a waveguide as a new degree of freedom in addition to wavelength-division multiplexing (WDM), ultra-high bandwidths, e.g., over 4 Tb/s for five modes, should be attainable in a single integrated silicon waveguide. Parallel efforts for spatial multiplexing in fiber communication have also received great attention, with multi-core and few-mode fiber technologies developing rapidly to enable data transfer as high as 1 Pb/s over kilometers of fiber. Spatial multiplexing additionally enables new flexibility and reconfigurability in routing data through optical networks by mode in addition to wavelength.

When implemented on integrated photonic platforms, MDM can also relieve the constraint on the large number of laser wavelengths needed for some WDM applications. Hence, a great deal of recent work has focused on on-chip MDM using silicon photonics. For example, techniques for exciting higher-order modes have been explored using integrated mode converters, Y-junctions, or mode rotation. Asymmetric couplers have been developed as a candidate to achieve MDM by utilizing phase-matching to selectively excite modes. Recently, multiplexers and demultiplexers have been demonstrated using asymmetric directional couplers having up to 8 modes with low crosstalk between channels. MDM has also been demonstrated using asymmetric coupling with microring resonators to allow compact multiplexers/demultiplexers for simultaneous MDM and WDM operations. A multimode filter has also been shown using a single microring to drop two modes. However, these existing systems and techniques are passive which do not allow active processing of modes independently. Moreover, while some progress has been made in routing multimode signals in a fiber, an integrated switch for routing multimode signals does not exist.

This patent disclosure discloses an active multimode optical switch, which processes multimode optical signals in the fundamental mode domain. This active multimode optical switch is compatible with both MDM and WDM operations to enable a fully reconfigurable and bandwidth-dense network.

Multimode switches can be used to expand the bandwidth and flexibility of a mode-multiplexed network. However, the mismatched optical properties of individual spatial modes pose fundamental challenges in designing such switches. Ideally, multimode switch should be compatible with WDM to allow for maximum bandwidth scaling. It should also be able to access and switch an arbitrary channel, by either mode or wavelength, independently of the others, thereby enabling reconfigurable networks. While the distinct optical properties of different modes can make multiplexing easier, the dissimilarity between modes also makes manipulation of individual channels and WDM difficult. Conventionally, compact switching is achieved in single-mode devices using an microring resonator. However, for multimode switching, the modes have different group indices. As a result, the free spectral range (FSR) of each mode in a microring resonator also deviates. Because the resonances do not align to a uniform channel spacing, a ring-based approach is often incompatible with WDM. Moreover, the mode confinements in a multimode waveguide vary greatly, and as such, coupling requirements also differ by mode and can require impractical lengths, e.g., several millimeters for a five-mode waveguide. In particular, the high confinement of the fundamental mode in highly multimode waveguides prevents arbitrary access to individual channels, limiting most applications of MDM.

In some implementations, the spectral and confinement challenges can be overcome by performing the signal processing in the single-mode domain, in which the modal properties are identical. Based on this approach, a wide array of processing options developed for single-mode waveguides can become available for MDM-WDM networks. Some disclosed techniques converts a multimode MDM optical signal to the fundamental modes for subsequent processing. The conversion can be implemented either on a chip or in a fiber. In some embodiments, nearly seamless conversion can be achieved between the multimode and single-mode domains using phase-matching between a multimode waveguide and sets of identical single-mode ring resonators. This conversion allows for the use of single mode rings for switching operations, which avoids the aforementioned multimode WDM limitations. This approach is also conducive to the requirement of individual control of modes, because the generated single mode channels have substantially identical optical properties.

The disclosed technology can be used to construct an active optical switch for on-chip MDM devices. We have also demonstrated using tunable resonators by various tuning effects such as thermal tuning with heaters to actively change the state of a MDM device. The disclosed switch has the benefit that it can switch MDM signals with full selectivity, i.e., any mode or wavelength channel can be directed to any output. Converting a multimode signal to the fundamental mode makes it much easier to process MDM signals which also use WDM, because WDM elements are already developed for fundamental mode/single-mode waveguides. Different from some MDM multiplexers, some disclosed devices use microring resonators rather than directional couplers. In an exemplary device which has WDM-compatibility and individual channel control, we demonstrate a 1×2 reconfigurable switch that routes four channels between multimode waveguides.

Various embodiments include an active multimode platform which is configured to process the spatial modes' signals individually using single-mode elements. In some embodiments, a set of multimode signals are converted into single mode signals or fundamental mode signals, e.g., each multimode signal to a corresponding single/fundamental mode signal, while preserving original identity information about the multimode signals/channels for subsequent reconversion into multimode waveguides, as illustrated in FIG. 1. This technique allows all signal channels to be equally accessible, regardless of mode or wavelength. Consequently, many processing options become available after the conversion, such as modulation or wavelength-selective switching with small radius, large-FSR rings. After processing the signals in the signal mode or fundamental mode domain, each processed single mode/fundamental mode signal is restored to the multimode domain. To convert multimode channels into the single/fundamental mode and back, a phase-matching condition is used by optimizing waveguide widths to match the effective indices of refraction. We use dimensions similar to those in previous work on multiplexers (See Luo, L.-W. et al. WDM-compatible mode-division multiplexing on a silicon chip. Nat. Commun. 5, (2014)), and the full phase-matching and coupling design is descried below. This approach allows the device to take advantage of the dissimilarities between modes, which enables the low crosstalk of existing multiplexers, without suffering the aforementioned disadvantages of modal diversity. In an exemplary device, the multimode silicon waveguides are optimized for a width of 930 nm to give an effective index of 2.46 for the second-order mode ($TE_1$), which matches the same index of 2.46 for the fundamental mode ($TE_0$) in a 450 nm waveguide.

FIG. 1 shows a diagram illustrating an exemplary process of the multimode processing technique. As can be seen in FIG. 1, to avoid fundamental limitations on accessing individual mode-multiplexed channels, the signals are converted into the single-mode domain to allow processing (active filtering is shown as an example). Because the converted single mode channels are temporarily encoded as the fundamental mode, they can be accessed and processed independently of modal identity. Finally, the single-mode channels are restored as higher-order spatial modes to a multimode waveguide output.

In some embodiments, the technique of processing multimode signals by converting the signals to the fundamental mode can be implemented using the following steps. First, the multimode inputs are configured such that the modes are separated, and therefore each mode goes to a different single-mode waveguide. If WDM is also used, then all wavelengths should be maintained. This stage essentially functions the same way as demultiplexers. However, this stage also preserves information about the identities of each mode for later reconversion. Next, the processing is performed. Because it is the fundamental modes that are processed, all of the different mode channels have substantially identical properties, whereas in the multimode input waveguide, the modes prior to the conversion had different properties depending on which mode they were encoded in. The processing can include, but are not limited to modulation, switching, and filtering. When the processing is switching, each signal can either continue or be switched to an alternate path. Next, signals in the single-mode waveguides are reconverted into multimode MDM waveguides. This stage essentially functions a multiplexer. This stage is configured such that modes are restored to their original identity prior to the conversion to the single modes. This can be done by designing the order of multiplexing and demultiplexing. The described process can allow for an MDM signal input (which can optionally be simultaneously WDM) and MDM (also WDM) output(s), while the processing between the input and output(s) is done in the fundamental mode (i.e., temporarily not in MDM mode).

The design in FIG. 1 can be used to implement a method for processing different optical signal channels. This method includes receiving different input optical signal channels in different optical waveguide modes and in different wavelengths and converting input optical signal channels in multimodes into single-mode optical signal channels, respectively. This conversion process can be implemented to preserve the mode information of the input optical channels. Subsequent to the conversion into single modes, the single-mode optical signal channels obtained from the different input optical signal channels are processed to re-group single-mode optical signal channels into different groups of processed single-mode optical signal channels. The hardware for this processing and re-grouping is designed to allow all optical channels to be equally accessible for the desired output results. Next; the different groups of the processed single-mode optical signal channels are converted into different groups of output optical signal channels containing one or more optical signal channels in multimodes to direct the groups as different optical outputs. In this conversion process, the mode information of the input may be restored, e.g., an input optical channel in a particular optical mode may be reflected by an output optical channel in the same particular optical mode.

The following sections and FIGS. 2A, 2B, 2C and 2D describe a specific example of a multimode 1×2 switch based on the above-described mode conversion technique.

FIG. 2A shows this example switch with 1 input and 2 outputs. FIG. 2B shows the modules and components of the switch in FIG. 2A.

Referring to FIG. 2B, this switch includes an input multimode optical waveguide that carries different input optical signal channels in either different optical wavelengths or different optical waveguide modes; and an input optical mode conversion module that receives the different input optical signal channels and outputs the different input signal channels as different single-mode intermediate optical signal channels, respectively. FIG. 2B shows first single-mode optical waveguides (1st SM WG) coupled to the optical mode conversion module to receive the different single-mode intermediate optical signal channels, each first single-mode optical waveguide being structured to carry a designated single optical mode different an optical mode designated to another first single-mode optical waveguide. FIG. 2B also shows second single-mode optical waveguides (2nd SM WG) coupled to receive the different single-mode intermediate optical signal channels that are initially carried by the first single-mode optical waveguides. This switch implements wavelength-selective optical switching elements SW1, SW2, SW3 and SW4, each optically coupled between one of the first single-mode optical waveguides and one of the second single-mode optical waveguides and operable to switch on to couple light of a particular selective wavelength from the first single-mode optical waveguide into a corresponding second single-mode optical waveguide or to switch off to prevent optical coupling between the first and second single-mode optical waveguides. In addition; an output optical mode conversion module is coupled to the first and second single-mode optical waveguides downstream from the wavelength-selective optical switching elements to receive the different input optical signal channels based on switching performed by the wavelength-selective optical switching elements and to combine at least outputs of at least one first single-mode optical waveguide and one second single-mode optical waveguide to produce different combined optical outputs where each optical output is in a multimode. FIG. 2B shows output multimode optical waveguides coupled to the output optical mode conversion module to receive the different combined optical outputs that carry different output optical signal channels that correspond to the different input optical signal channels in different combinations of the different input optical signal channels based on switching performed by the wavelength-selective optical switching elements In some embodiments, the switch directs four data channels, including two transverse electric modes, $TE_0$ (fundamental) and $TE_1$, at two wavelengths near 1550 nm, from the switch input to either of two output ports (e.g., FIG. 2A). Each of the four channels can be routed independently of each other for full switching selectivity. The switch operates by first converting all channels into the fundamental mode, while retaining distinct paths for the two modes for future reconversion (e.g., FIG. 2B). An example switching configuration is shown in FIG. 2B. As can be seen in FIG. 2B, the switching backbone includes racetrack ring resonators to allow for compact, active control by integrated heaters. While these rings are typically tuned into resonance when the desired channel is set to be switched, the rings for mode conversion are mostly on resonance. The switching rings have half the circumference of the conversion rings to allow for a doubled FSR (10 nm and 5 nm respectively). This configuration allows for wavelength-selective switching so that the conversion rings operate at every resonance and the switching rings are interleaved and access every other resonant wavelength. Increasing the number of switching rings allows accommodation of more channels, and because they are not limited to interfacing with higher-order modes, small radii, e.g., 1.5 μm, are achievable. Both the switched and through-transmitted signals are reconverted to their original modes at either multimode output.

FIGS. 2A and 2B show an exemplary multimode switch design. FIG. 2A shows a block diagram of 1×2 multimode switch operation. The four input data streams, including two modes at two wavelengths, may be switched in any combination to the two outputs. The example shows that three channels are routed to Output 1 (top) and one channel to Output 2 (bottom). FIG. 2B shows a schematic of an exemplary multimode switch implementation. The input $TE_1$ channels are converted to the fundamental mode through phase-matching to single-mode rings. The channels are switched using actively-tuned rings to route each channel individually. This example shows that three channels switching to Output 1, while the ring for $TE_0:\lambda_2$ is off-resonance to pass that channel to Output 2.

As an example, using above-described approaches, we fabricated an MDM switch using multiplexers and demultiplexers with microring resonators. These rings are single-mode, but they couple to the multimode waveguides on one side, and also to single-mode waveguides on the other side. The widths can be designed to meet a phase matching condition so that exactly one mode is excited/accessed in the multimode waveguide. This way the MDM signal can be converted back and forth easily to the fundamental mode.

For the switching shown in FIG. 2B, SW1 is on, SW2 is off, SW3 and SW4 are on; For the switching shown in FIG. 2C, SW1 is on, SW2 is off, SW3 is off and SW4 is on; for the switching shown in FIG. 2D, SW1 is off, SW2 is off, SW3 is off and SW4 is off.

Switching Performance Characterization

Figure 3C:
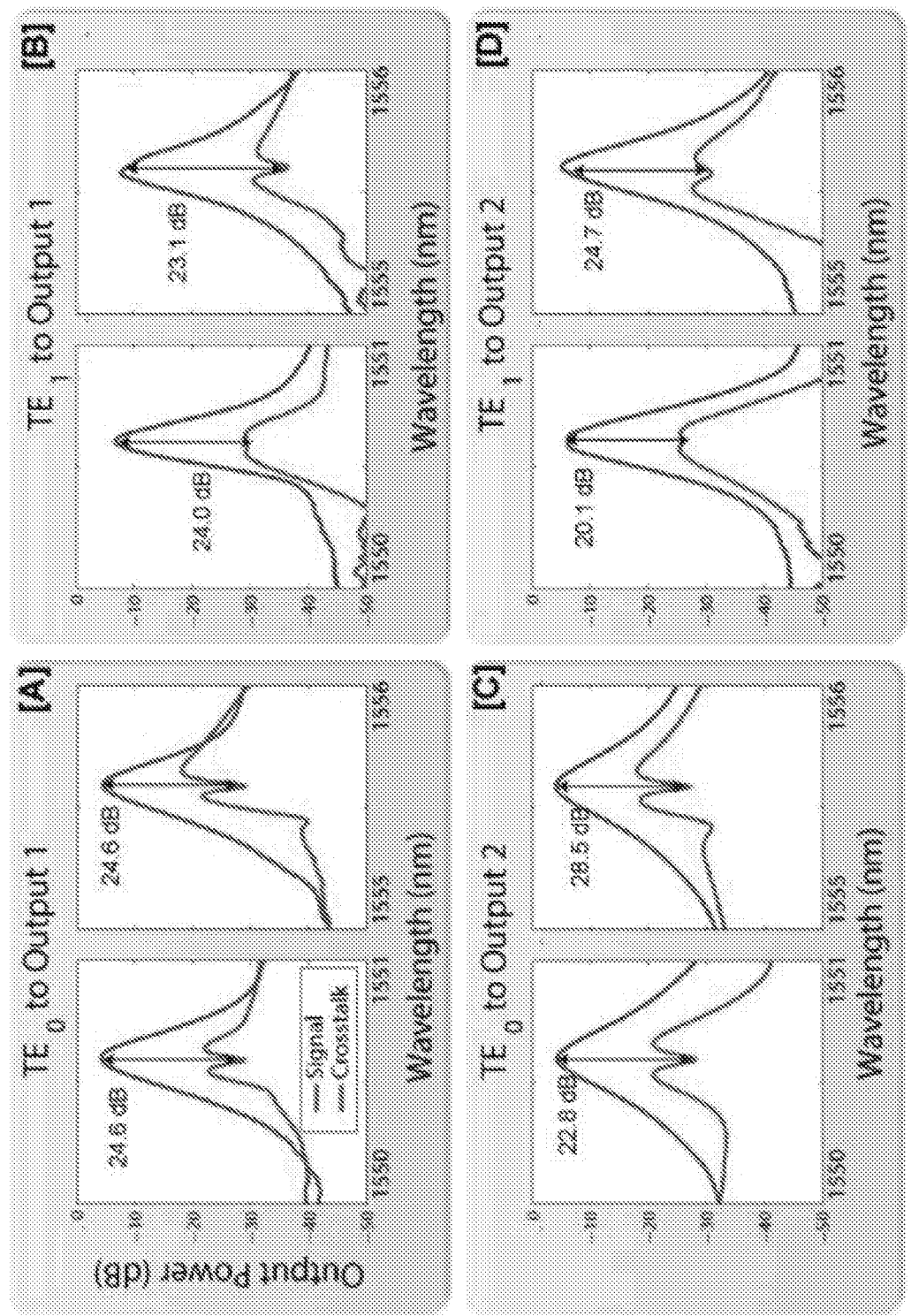
FIG. 3C shows comparison of switching channels and crosstalk.

We measure <−20 dB crosstalk when switching the four individual channels to each output. FIGS. 3A-3B show a microscope (optical) image and a SEM image of an exemplary on-chip multimode switch, fabricated on a silicon-on-insulator (SOI) wafer. A detailed explanation of fabrication process is described below. To couple on and off the chip using single-mode edge coupling, the multimode input of the switch is preceded by a multiplexer and each output uses a demultiplexer. By launching one input mode at a time, we were able to determine the crosstalk between channels by comparing their respective signal strengths at each output (FIG. 3C). For all channels and switching configurations, the crosstalk is less than −20 dB, ranging from −20.1 dB to −28.5 dB for the worst-case state for each channel. Additionally, the crosstalk remains better than −18 dB across the entire C-band (1530-1565 nm). These crosstalk values remain close to previous multimode multiplexer/demultiplexer systems.

The measured insertion loss, including on- and off-chip coupling losses, ranges from 6.0 to 9.6 dB for the four channels. Based on measured losses from test structures, the coupling loss is approximately 4.5 dB. This remaining loss range of 1.5 to 5.1 dB includes the multiplexers/demultiplexers in addition to the switch itself. Because the $TE_1$ channel was converted four times, it had higher insertion loss. However, if rings are fabricated to ensure critical coupling, then lower and more uniform insertion loss can be attained. Due to fabrication variation, the rings are slightly overcoupled in the example shown. Even though the crosstalk shown in FIG. 3C is already low, considering that the four conversion steps were used, the crosstalk can be further reduced by using longer coupling lengths and larger gaps to increase the phase-matching selectivity. Uniquely to our approach, this extra ring size will not limit the WDM-compatibility because the switching rings can still retain small radii.

FIG. 3A shows an optical microscope image of a fabricated device. The input channels are coupled into single-mode waveguides from an off-chip laser, and a multiplexer (mux) produces the MDM input to the multimode switch. The areas highlighted in blue show the multimode waveguides. The four small rings actively switch the four channels. Following the switch, each of the two outputs is demultiplexed (demux) so that the channels can be individually monitored off-chip. The switch area is <0.074 $mm^2$, and an even more compact design could be achieved by using smaller tapers or placing components closer together. FIG. 3B shows a scanning electron microscope (SEM) image of the clad device with active heaters used to tune the rings. FIG. 3C shows comparison of switching channels and crosstalk. Spectral profiles of power at both outputs for each of the four channels, compared with crosstalk from interfering channels. Signal and crosstalk were measured individually by sweeping a continuous wave tunable laser, with the worst-case switching configuration's crosstalk plotted. The crosstalk is less than −20 dB in all cases.

Switching of High-Speed Modulated Data

Figure 4A:
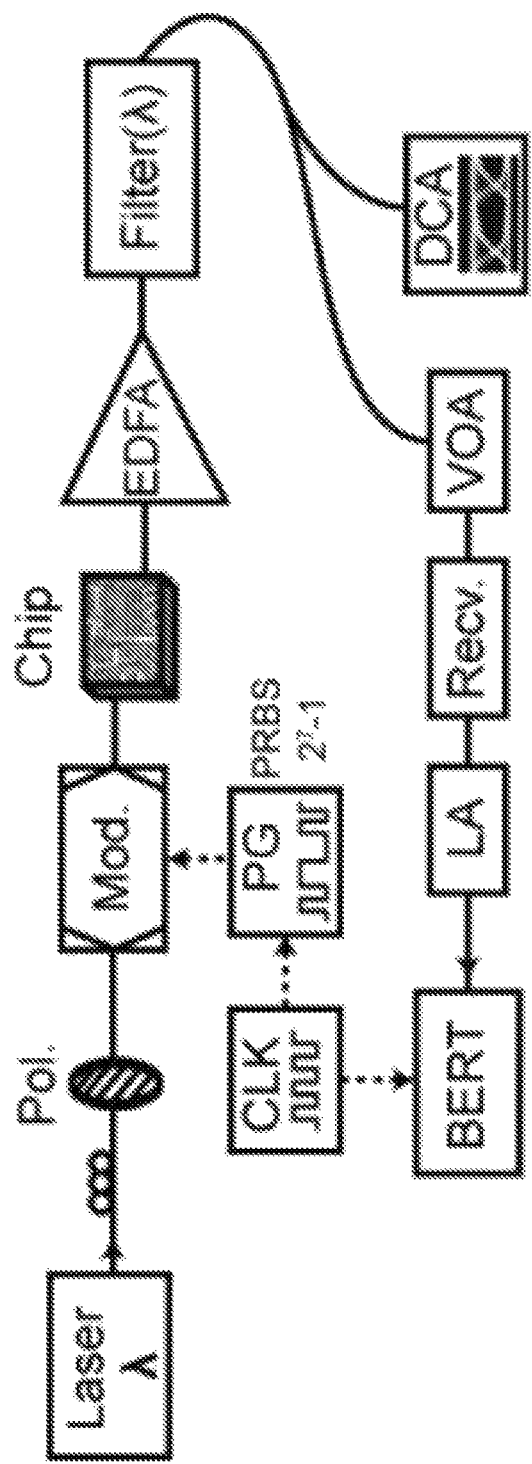
FIG. 4A shows testing configuration, including tunable laser, electro-optic modulator (Mod.), a pseudo-random bit sequence (PRBS) from the pattern generator (PG), function generator clock source (CLK), Er-doped fiber amplifier (EDFA), tunable band-pass filter (1.4 nm), digital communications analyzer (DCA), variable optical attenuator (VOA), optical receiver (Recv.), limiting amplifier (LA), and bit-error rate tester (BERT).
Figure 4B:
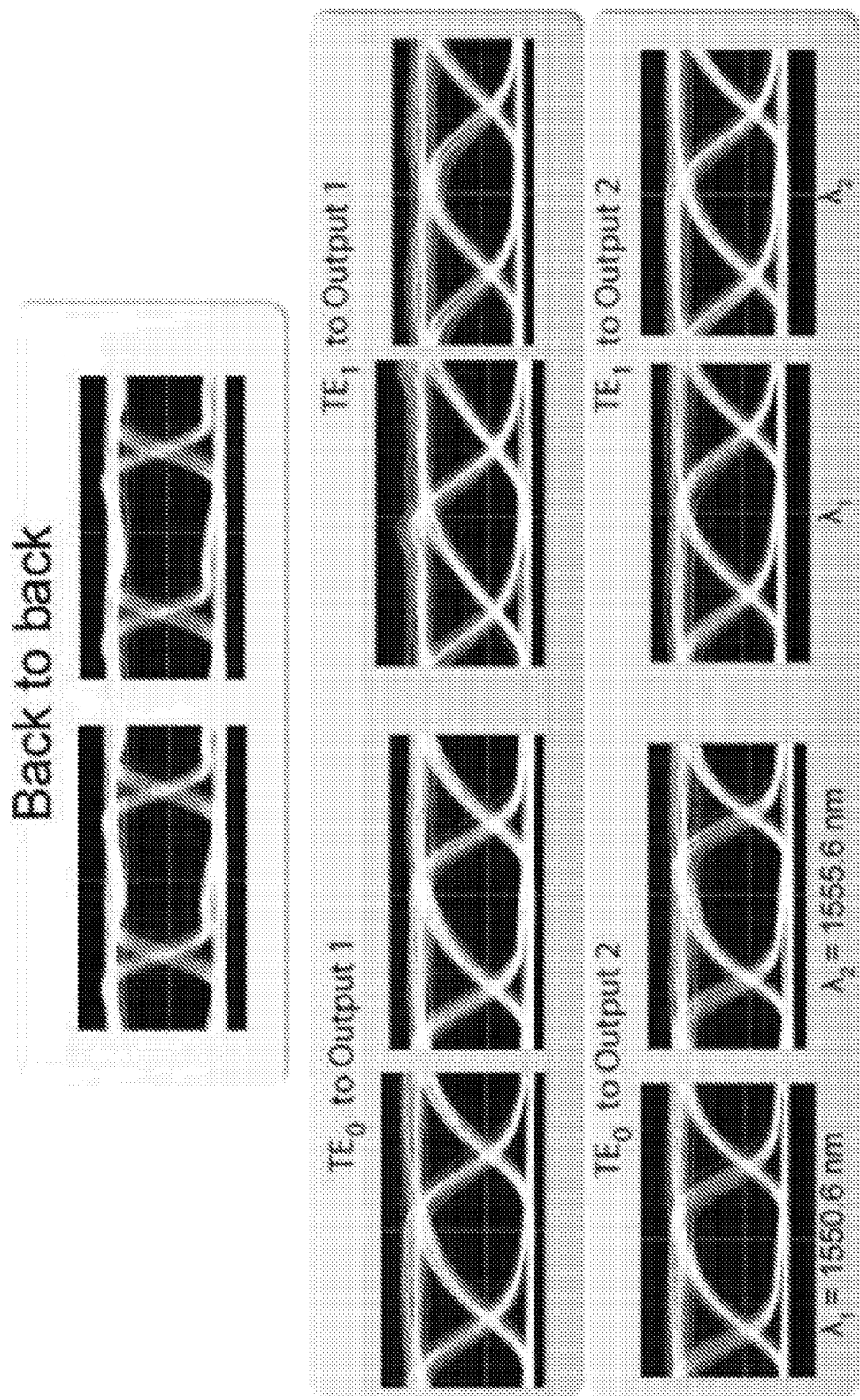
FIG. 4B shows eye diagrams of the switched signals for all channels at both outputs, all eye diagrams are open.
Figure 4C:
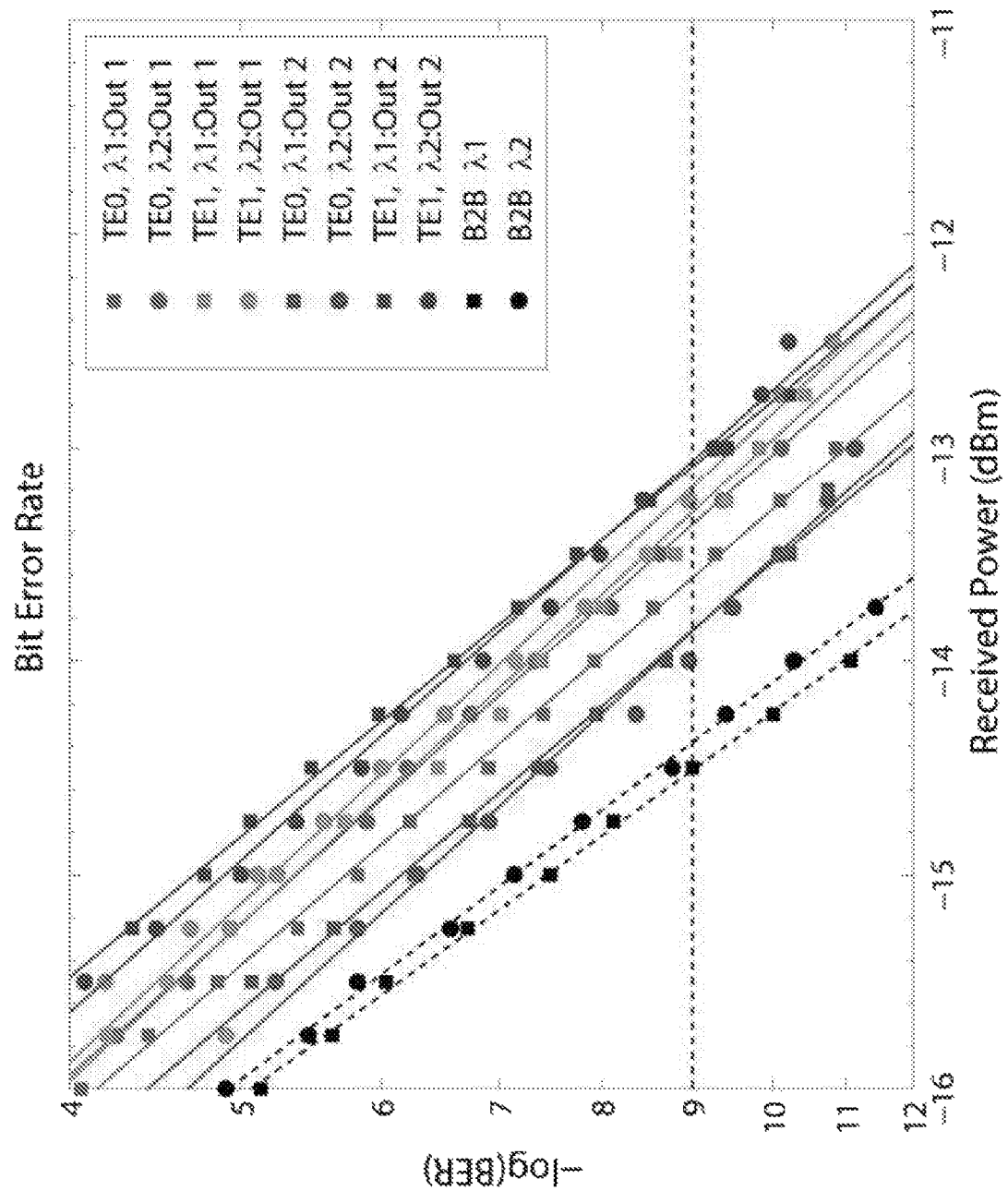
FIG. 4C shows error free transmission ($10^{-9}$) is achieved with power penalties ranging from 0.52-1.42 dB.

The 1×2 switch exhibits error-free performance, with a bit-error rate (BER) below $10^{-9}$, and open eye diagrams while routing 10 Gb/s data. We perform the experiment using a tunable laser modulated by a pseudo-random bit sequence from a pattern generator (FIG. 4A). This modulated light is coupled onto the chip using a tapered fiber. A DC voltage is applied to each integrated heater to align their resonances with the laser. The signal of the output being measured is amplified by an EDFA and filtered to obtain optical eye diagrams of the transmitted data pattern (FIG. 4B). The eye diagrams remain open for all four channels routed to either output. A back-to-back reference is also measured for each wavelength by removing the chip and replacing the tapered fibers with a single fiber connection. The channels can be switched between outputs using integrated heaters to detune the resonances. The total power supplied to the heaters in the switch is up to 30 mW, depending on the switching state, which is almost entirely used for aligning the resonances of all rings due to fabrication variations. We further characterize the data integrity with BER measurements (FIG. 4C). We measure error-free switching (BER<$10^{-9}$) for all channels, with the power penalty ranging 0.52-1.02 dB for $TE_0$ and 1.2-1.42 dB for $TE_1$. The rise and fall times for 10 Gb/s signals in FIG. 4B indicate that the switch is limited by the photon lifetime, which is caused by narrowing of the bandwidth after multiple conversion stages. The narrowest channel is $TE_1$ at Output 1, with a 9.2 GHz bandwidth, as seen in the spectrum of FIG. 3C. This bandwidth can be easily increased to 15-20 GHz with stronger coupling for each ring, which would improve both the eye diagrams and power penalty.

FIGS. 4A-4C show error-free switching of 10 Gb/s MDM-WDM data. FIG. 4A shows testing configuration, including tunable laser, electro-optic modulator (Mod.), a pseudo-random bit sequence (PRBS) from the pattern generator (PG), function generator clock source (CLK), Er-doped fiber amplifier (EDFA), tunable band-pass filter (1.4 nm), digital communications analyzer (DCA), variable optical attenuator (VOA), optical receiver (Recv.), limiting amplifier (LA), and bit-error rate tester (BERT). FIG. 4B shows eye diagrams of the switched signals for all channels at both outputs, all eye diagrams are open. Comparison with the rise time of back-to-back eyes confirms that the output signal is bandwidth-limited. FIG. 4C shows error free transmission ($10^{-9}$) is achieved with power penalties ranging from 0.52-1.42 dB.

The above example of an integrated multimode switch for high-speed modulated data establishes MDM as a viable standard for optical interconnects. Because the disclosed active device is compatible with both MDM and WDM operations, the disclosed technology allows unprecedented scaling of bandwidth density on silicon chips. While each multimode input or output in the above example carries 40 Gb/s of bandwidth (4×10 Gb/s), the design can be scalable to more modes (e.g., $5^{-10}$) and many more wavelengths (e.g., 80 channels). With the ability to route MDM signals with full flexibility, on-chip MDM-WDM networks can develop for many nodes connected by high-bandwidth multimode links. The platform we proposed for processing multimode signals in the single-mode domain also offers the possibility for numerous future applications beyond signal routing.

EXEMPLARY IMPLEMENTATIONS

Phase Matching Waveguide Width

In some implementations, asymmetric coupling regions can be used in the multiplexer, demultiplexer, and mode conversion steps of the switch. The multimode waveguides can be designed to be 930 nm wide to accommodate phase-matching between the $TE_1$ mode and the $TE_0$ mode of 450-nm wide single-mode waveguides (see FIGS. 5A-5C). At this combination of widths, the effective indexes of the modes in their respective waveguides can be matched, and the $TE_0$ mode in the single-mode waveguide selectively excites the $TE_1$ mode in the multimode waveguide, without also exciting the $TE_0$ therein, which would contribute to crosstalk. If the fundamental mode alone is present in a waveguide, it can be adiabatically tapered wider or narrower without disturbing the mode.

Figure 5A:
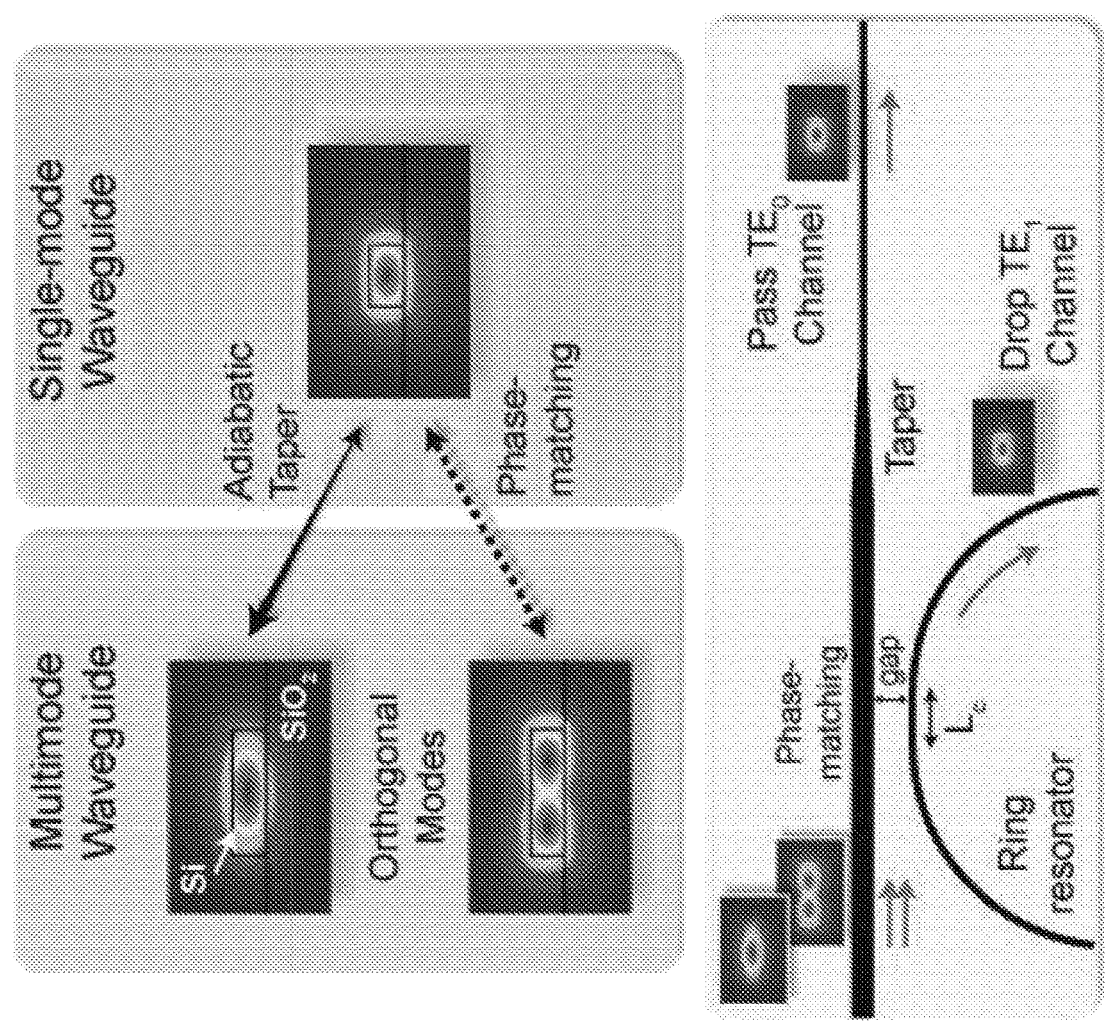
FIG. 5A shows an exemplary process for accessing individual modes in a multimode waveguide.
Figure 5B:
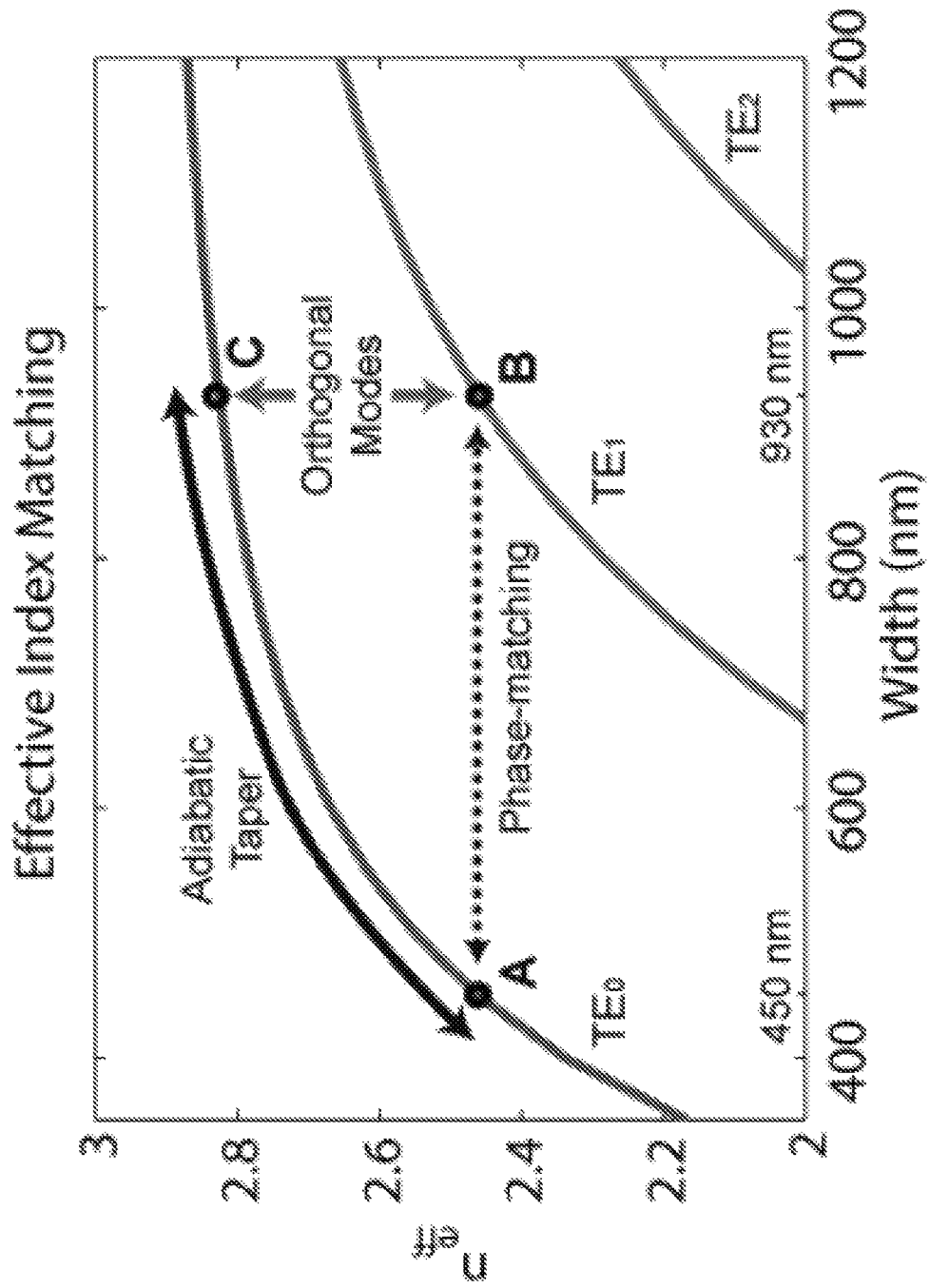
FIG. 5B shows exemplary results of simulated effective index of 250-nm tall Si waveguide as a function of width.

FIG. 5A shows an exemplary process for accessing individual modes in a multimode waveguide. A single-mode ring resonator which is correctly phase-matched to the bus waveguide will drop the $TE_1$ channel, while the $TE_0$ channel can be tapered into a single-mode waveguide. FIG. 5B shows exemplary results of simulated effective index of 250-nm tall Si waveguide as a function of width. The phase-matching condition is met when the index for $TE_0$ in the single-mode waveguide matches that of $TE_1$ in the multimode bus waveguide.

Coupling Design

In some implementations, the racetrack ring resonators used for the multiplexers/demultiplexers have radii of 16 μm and coupling lengths of 5.9 μm, at which the crosstalk was simulated to be minimized. The switching rings have 8.6 μm radii and 1.2 μm coupling lengths. The coupling gaps between the rings and waveguides were chosen meet the critical coupling condition $\kappa = \kappa' + \alpha$, where $\kappa$ and $\kappa'$ are the add and drop port coupling constants, respectively. To enable 10 Gb/s operation, $\kappa$ and $\kappa'$ can also be optimized for a bandwidth 16 GHz. The coupling gaps are listed in Table 1. The taper length is 95 μm.

TABLE 1

Coupling gaps between waveguides and microrings. The gaps of the conversion rings used in multiplexers/demultiplexers and the switching rings were optimized for critical coupling using a finite element method (FEM) solver.

| Coupling Region | Gap (nm) |
| --- | --- |
| $TE_1$ MM to SM ring - Add port | 210 |
| $TE_1$ MM to SM ring - Drop port | 220 |
| $TE_0$ SM to SM ring - Add port | 247 |
| $TE_0$ SM to SM ring - Drop port | 257 |
| Switching Ring - Add port | 194 |
| Switching Ring - Drop port | 203 |

Device Fabrication

We fabricated the switch on a 250-nm thick device layer silicon-on-insulator (SOI) wafer with 3 μm buried oxide. The waveguides were patterned using electron beam lithography and etched through using reactive ion etching. The devices were then clad with 1 μm of SiO2. A thin Cr adhesion layer and 100 nm of Ni were evaporated along with a lift-off process to define the heaters for tuning resonances. For the metal contacts, 1.7 um of Al was sputtered with a thin Ti adhesion layer and then etched using inductively coupled plasma. Deep trenches were etched into the silicon substrate near the input and output waveguide tapers for improved coupling. The final chip was mounted to a custom printed circuit board (PCB), onto which the Al pads were wirebonded for easy control of heater tuning.

Other Variations

The disclosed technology can be applied to MDM in fiber (also referred to as "SDM"), other than on-chip. The multiplexing/demultiplexing steps may not be able to use the microring/phase-matching technique. However, phase plates or photonic lanterns may be used instead.

In some embodiments, the multiplexing/demultiplexing components of the integrated switch can be implemented using directional couplers, rather than the rings.

Besides switching, other processing of the multimode optical signals can include filtering and modulation, among others.

While we showed examples of two modes and two wavelengths, the device designs can be expanded to more modes and wavelengths, e.g., 10 modes, and e.g., 80 wavelengths. These larger designed can be achieved by scaling the multiplexers/demultiplexers, and using more rings for switching.

While we have shown examples of silicon waveguides over a silicon dioxide undercladding on a silicon substrate, silicon nitride waveguides can also be used (e.g., multiplexers in silicon nitride have been made).

Figure 6:
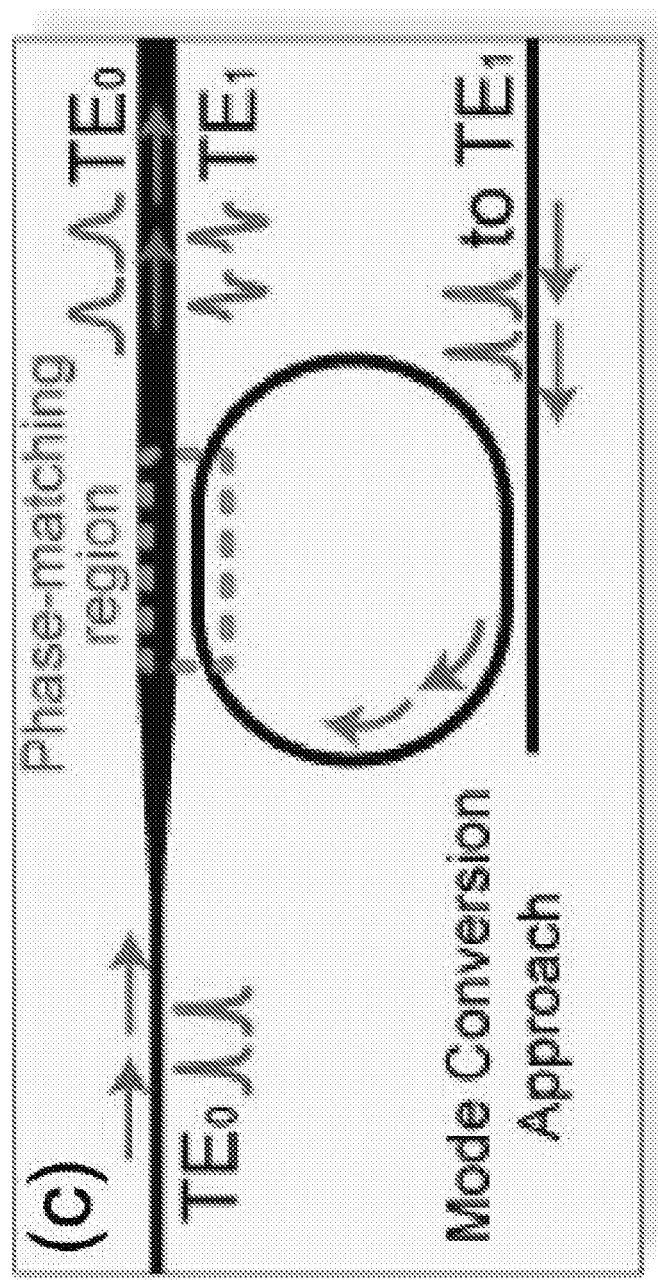
FIG. 6 shows the ring resonator used for the mode conversion operation for TE1 resonator at the input and the TE1 resonator at the output 1 and the TE0 resonator for the output 2 in FIG. 2B.

FIG. 6 shows the ring resonator used for the mode conversion operation for TE1 resonator at the input and the TE1 resonator at the output 1 and the TE0 resonator for the output 2 in FIG. 2B. the input optical mode conversion module includes: a tapered optical waveguide section including a first input end coupled to an end of the input multimode optical waveguide and a second output end; a single-mode optical waveguide section coupled to the second output end of the tapered optical waveguide section to transform light in a multimode into light in a single mode; and a ring resonator optically coupled to the input multimode optical waveguide to optically couple light in a multimode into the ring resonator and further optically coupled to one of the first single-mode optical waveguides to couple light out of the ring resonator into the one of the first single-mode optical waveguides as two or more of the different single-mode intermediate optical signal channels.

Applications

The disclosed technology will likely find use in optical communications equipment. Long-distance communication has been exploring MDM/SDM, so it may become possible in the future to interface MDM on chip with the equivalent in fiber (which is an enormous industry) as we look to increase bandwidth. On-chip processing has many advantages, including reliability and size. MDM will likely find its way into data centers (such as those of Google, Amazon, etc.) which have big issues related to heat and power. Integrated photonics is already commercial available (e.g., Infinera), but MDM is a relatively new technique for increased bandwidth on-chip, and therefore integrated optical transceivers and switches may find MDM components to be of great benefit.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this patent document and its attachments.

What is claimed is:

1. An optical switch system, comprising:
an input multimode optical waveguide that carries different input optical signal channels in either different optical wavelengths or different optical waveguide modes;
an input optical mode conversion module that receives the different input optical signal channels and outputs the different input optical signal channels as different single-mode intermediate optical signal channels, respectively;
first single-mode optical waveguides coupled to the optical mode conversion module to receive the different single-mode intermediate optical signal channels, each first single-mode optical waveguide being structured to carry a designated single optical mode different from an optical mode designated to another first single-mode optical waveguide;
second single-mode optical waveguides coupled to receive the different single-mode intermediate optical signal channels that are carried by the first single-mode optical waveguides;
wavelength-selective optical switching elements, each optically coupled between one of the first single-mode optical waveguides and one of the second single-mode optical waveguides and operable to switch on to couple light of a particular selective wavelength from the first single-mode optical waveguide into a corresponding second single-mode optical waveguide or to switch off to prevent optical coupling between the first and second single-mode optical waveguides;
an output optical mode conversion module coupled to the first and second single-mode optical waveguides downstream from the wavelength-selective optical switching elements to receive the different input optical signal channels based on switching performed by the wavelength-selective optical switching elements and to combine at least outputs of at least one first single-mode optical waveguide and one second single-mode optical waveguide to produce different combined optical outputs, wherein each optical output is multimode; and
output multimode optical waveguides coupled to the output optical mode conversion module to receive the different combined optical outputs that carry different output optical signal channels that correspond to the different input optical signal channels in different combinations of the different input optical signal channels based on switching performed by the wavelength-selective optical switching elements.

2. The system as in claim 1, wherein:
the input optical mode conversion module includes:
a tapered optical waveguide section including a first input end coupled to an end of the input multimode optical waveguide and a second output end;

a single-mode optical waveguide section coupled to the second output end of the tapered optical waveguide section to transform light in a multimode into light in a single mode; and a ring resonator optically coupled to the input multimode optical waveguide to optically couple multimode light into the ring resonator and further optically coupled to one of the first single-mode optical waveguides to couple light out of the ring resonator into the one of the first single-mode optical waveguides as two or more of the different single-mode intermediate optical signal channels.

3. The system as in claim 2, wherein:
the ring resonator is optically coupled to the input multimode optical waveguide to optically couple light at different optical wavelengths separated by one or more free spectral ranges of the ring resonator as part of the two or more of the different single-mode intermediate optical signal channels.

4. The system as in claim 2, wherein:
the ring resonator is a tunable ring resonator to change either an index or a ring resonator length of the ring resonator in response to a resonator control signal.

5. The system as in claim 4, wherein:
the ring resonator is tuned based on an electro-optic effect.

6. The system as in claim 4, wherein:
the ring resonator is tuned based on a thermal effect.

7. The system as in claim 2, wherein:
the input optical mode conversion module includes:
a second ring resonator optically coupled to the single-mode optical waveguide to optically couple light therein into the second ring resonator in a mode different from a ring resonator mode and further optically coupled to a different first single-mode optical waveguide to couple light out of the ring resonator into the different single-mode optical waveguide section as other single-mode intermediate optical signal channels.

8. The system as in claim 7, wherein:
the second ring resonator is a tunable ring resonator to change either an index or a ring resonator length of the ring resonator in response to a second resonator control signal.

9. The system as in claim 8, wherein:
the ring resonator is tuned based on an electro-optic effect.

10. The system as in claim 8, wherein:
the ring resonator is tuned based on a thermal effect.

11. The system as in claim 7, wherein:
the second ring resonator is optically coupled to the single-mode optical waveguide to optically couple light at different optical wavelengths separated by one or more free spectral ranges of the second ring resonator.

12. The system as in claim 1, wherein:
the output optical mode conversion module includes:
a first tapered output optical waveguide section including an input end coupled to an output terminal of a first or second single-mode optical waveguide and an output end coupled to a first one of the output multimode optical waveguides to transform light in a single mode into a multimode of the first output multimode optical waveguide; and a first output ring resonator optically coupled to another first or second single-mode optical waveguide that is not coupled to the first tapered output optical waveguide via the first tapered output optical waveguide section to receive light in a single mode from the other first or second single-mode optical waveguide into the first output ring resonator and further optically coupled to the first output multimode optical waveguide to couple light out of the first output ring resonator into the first output multimode optical waveguide.

13. The system as in claim 12, wherein:
the output optical mode conversion module includes:
a second tapered output optical waveguide section including an input end coupled to an output terminal of a first or second single-mode optical waveguide and an output end coupled to a second one of the output multimode optical waveguides to transform light in a single mode into a multimode of the second output multimode optical waveguide; and a second output ring resonator optically coupled to a different first or second single-mode optical waveguide that is not coupled to the second tapered output optical waveguide via the second tapered output optical waveguide section to receive light in a single mode from the different first or second single-mode optical waveguide into the second output ring resonator and further optically coupled to the second output multimode optical waveguide to couple light out of the second output ring resonator into the second output multimode optical waveguide.

14. The system as in claim 13, wherein:
the second output ring resonator is a tunable ring resonator to change either an index or a ring resonator length of the ring resonator in response to a second output ring resonator control signal.

15. The system as in claim 14, wherein:
the second output ring resonator is tuned based on an electro-optic effect.

16. The system as in claim 14, wherein:
the second output ring resonator is tuned based on a thermal effect.

17. The system as in claim 14, wherein:
the second output ring resonator is optically coupled to the different first or second single-mode optical waveguide that is not coupled to the second tapered output optical waveguide via the second tapered output optical waveguide section to receive light in a single mode from the different first or second single-mode optical waveguide into the second output ring resonator at different optical wavelengths separated by one or more free spectral ranges of the second output ring resonator.

18. The system as in claim 12, wherein:
the first output ring resonator is a tunable ring resonator to change either an index or a ring resonator length of the ring resonator in response to a first output ring resonator control signal.

19. The system as in claim 18, wherein:
the first output ring resonator is tuned based on an electro-optic effect.

20. The system as in claim 18, wherein:
the first output ring resonator is tuned based on a thermal effect.

21. The system as in claim 12, wherein:
the first output ring resonator is optically coupled to the other first or second single-mode optical waveguide that is not coupled to the first tapered output optical waveguide via the first tapered output optical waveguide section to receive light in a single mode from the other first or second single-mode optical waveguide into the first output ring resonator at different optical wavelengths separated by one or more free spectral ranges of the first output ring resonator.

22. The system as in claim 1, comprising:

a switch control circuit coupled to the wavelength-selective optical switching elements to individually control each wavelength-selective optical switching element to switch on or to switch off optical coupling at a particular selective wavelength between the coupled first and second single-mode optical waveguides.

23. The system as in claim 22, wherein:

each wavelength-selective optical switching element includes a tunable optical resonator that changes a resonance wavelength in response to a control signal from the switch control circuit.

24. The system as in claim 23, wherein:

each wavelength-selective optical switching element is a tunable ring resonator to change either an index or a ring resonator length of the ring resonator in response to the control signal.

25. The system as in claim 24, wherein:

the tunable ring resonator is tuned based on an electro-optic effect.

26. The system as in claim 24, wherein:

the tunable ring resonator is tuned based on a thermal effect.

* * * * *